United States Patent [19]

Yoshiro

[11] Patent Number: 4,919,455
[45] Date of Patent: Apr. 24, 1990

[54] JOINT MECHANISM FOR THIN-WALL STAINLESS STEEL PIPE

[75] Inventor: Nakamura Yoshiro, Tsuyama, Japan

[73] Assignee: O.N. Industries Co., Ltd., Okayama, Japan

[21] Appl. No.: 309,729
[22] PCT Filed: May 9, 1988
[86] PCT No.: PCT/JP88/00451
 § 371 Date: Jan. 26, 1989
 § 102(e) Date: Jan. 26, 1989
[87] PCT Pub. No.: WO89/11058
 PCT Pub. Date: Nov. 16, 1989

[51] Int. Cl.⁵ ............................................. F16L 55/00
[52] U.S. Cl. ........................................ 285/23; 285/93; 285/354; 285/369; 285/340
[58] Field of Search ................ 285/93, 369, 353, 354, 285/384, 386, 321, 332, 332.2, 334.5, 23, 340

[56] References Cited

U.S. PATENT DOCUMENTS

| 1,858,136 | 5/1932 | Brenner | 285/334.5 |
| 2,453,813 | 11/1948 | Prince | 285/354 |
| 2,540,368 | 2/1951 | Harding | 285/354 |
| 2,863,678 | 12/1958 | Gordon et al. | 285/332.2 |
| 3,139,293 | 6/1964 | Franck | 285/93 |
| 3,255,521 | 6/1966 | Callahan, Jr. | 285/93 |
| 3,393,932 | 7/1968 | Howe | 285/369 |
| 3,458,220 | 7/1969 | Rose et al. | 285/354 |
| 3,929,358 | 12/1975 | Eckhardt | 285/353 |
| 4,793,637 | 12/1988 | Laipply et al. | 285/93 |

FOREIGN PATENT DOCUMENTS 55-173720 12/1980 Japan .
59-107390 7/1984 Japan .
59-034782 9/1984 Japan .

Primary Examiner—Dave W. Arola
Attorney, Agent, or Firm—Kanesaka & Takeuchi

[57] ABSTRACT

A joint mechanism for connecting easily and tightly thin-wall stainless steel pipes (1) with an annular bead (6) at an end, which includes a joint sleeve (2) having a pair of annular recesses (7) at opposite ends and a central enlarged collar portion (9); a pair of coupling nuts (3) with an inclined shoulder (13) on the inside; and a pair of conical disc springs (5) with a distinctly colored outside (5a) mounted between the central enlarged collar portion and the coupling nuts. When the coupling nuts are threaded over the joint sleeve completely, the conical disc springs are compressed between the central enlarged collar portion and the coupling nuts making the distinct color of the conical springs invisible, thus indicating that the coupling nuts are fully tightened.

2 Claims, 2 Drawing Sheets

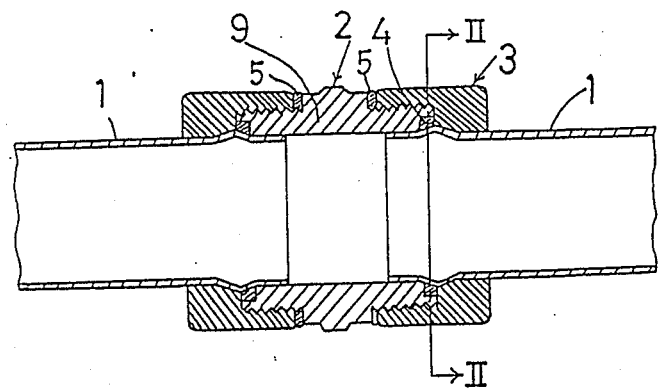
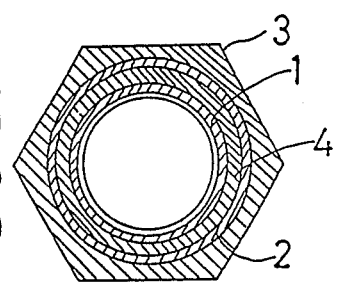
FIG. 1
FIG. 2
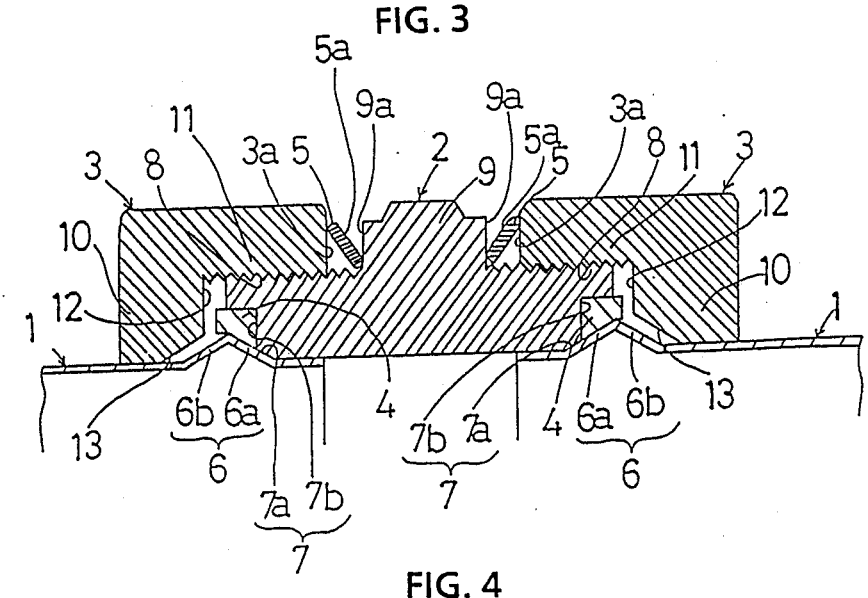
FIG. 3
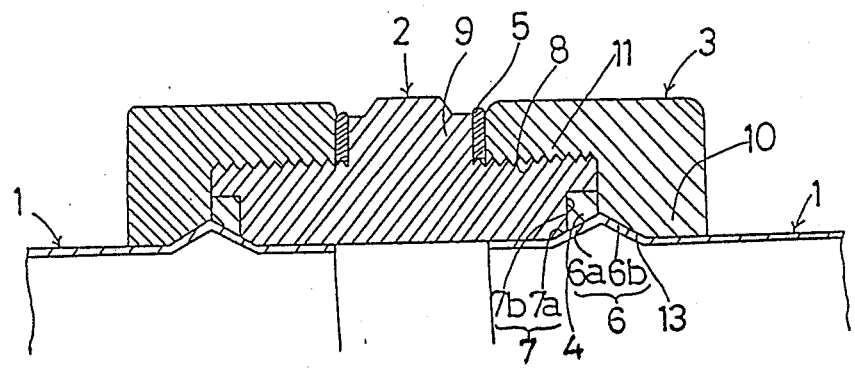
FIG. 4

JOINT MECHANISM FOR THIN-WALL STAINLESS STEEL PIPE

FIELD OF THE INVENTION

This invention relates to a joint mechanism capable of connecting easily and tightly in the field a pair of thin-wall stainless steel pipes for conducting a fluid.

BACKGROUND OF THE INVENTION

Thin-wall stainless steel pipes have been widely used inside or outside buildings for conducting a fluid such as water or steam. These thin-wall stainless steel pipes are replacing iron and copper pipes which are liable to corrosion, causing leakage, and vinyl pipes which have low resistance against both heat and cold weather.

Because stainless steel is very expensive and very hard but very extendible and malleable, the wall thickness of a stainless steel pipe is usually made approximately one millimeter. Consequently, it is difficult to thread the end portions of these thin-wall stainless steel pipes and join them with a nut. For this reason, soldering, welding, and double folding interlock have been used to connect them.

However, these joints do not have satisfactory strength against pulling force, are not removable and liable to corrosion, and require a skilled worker for making such connection. Thus, the inventor of this application has proposed a new joint mechanism in the Japanese U.M. Patent Application No. 58-2005 (Japanese U.M. Patent Application Kokai No. 59107390). This joint mechanism includes a V-shaped annular bead with a pair of inclined bearing faces on an end portion of a thin-wall stainless steel pipe and a joint sleeve having a diameter sufficiently large to receive the pipe. A male thread and an annular recess are provided on the outside surface and the inside edge of the joint sleeve, respectively. The joint sleeve is fitted over the pipe such that it abuts on a inclined face of the annular bead via an annular seal which is set in the annular recess. A coupling nut having an inside edge tapered so as to abut on the other inclined face of the annular bead is threaded over the joint sleeve to connect the pipe to the joint sleeve.

However, it has been impossible to check accurately by observation whether or not the coupling nut is completely tightened to the joint sleeve. As a result, the installer has had to guess when the coupling nut is tightened completely by feeling the resistance to further tightening, counting the number of turns of the coupling nut, or measuring the distance between the joint sleeve and the coupling nut. These operations, however, are not only troublesome but also inaccurate.

Accordingly, it is an object of the invention to provide a joint mechanism for thin-wall stainless steel pipes, which is able to withstand a large pulling force and easy to disconnect or remove, does not require a skilled worker, and enables anyone to observe the exact tightness of a coupling nut.

DISCLOSURE OF THE INVENTION

According to the invention there is provided a joint mechanism for connecting a pair of thin-wall stainless steel pipes each having at an end portion an annular bead with a pair of first and second inclined faces, including a joint sleeve which has a diameter sufficiently large to receive the pipes, a pair of first annular recesses with a seal groove thereon at opposite ends of the joint sleeve, a central enlarged collar portion, and a pair of externally threaded sleeve portions extending laterally from the central enlarged collar portion; a pair of coupling nuts which each have an internally threaded portion for engaging with the externally threaded portion, a reduced fitting portion for fitting over the pipe, an abutment face against which a front face of the joint sleeve abuts when the coupling nut is threaded on the joint sleeve, and an inclined shoulder for abutting against the first inclined face of the annular bead; a pair of annular seals for abutting against the second inclined face of the annular bead, the abutment face of a coupling nut, and the seal groove when the coupling nut is threaded on the joint sleeve, and a pair of conical disc springs mounted on the externally threaded joint sleeve between the coupling nut and the central enlarged collar portion and having an outside provided with a color which is distinct from those of adjacent members.

The thin-wall stainless steel pipes are connected by mounting the annular seals in the seal grooves, inserting the pipes into the joint sleeve, mounting the conical disc springs on the joint sleeve, and tightening the coupling nuts. The annular seal is made such that it abuts against the first inclined face, the abutment surface, and the seal groove so as to prevent any leakage of the fluid from the pipes. The annular bead is held by the tapered portion, the inclined shoulder, and the annular seal so as to prevent falling off of the pipes from the joint sleeve. Even if the thin-wall stainless steel pipes expand or contract at high or low temperatures, the annular bead is held by the tapered section of the joint sleeve and inclined shoulder of the coupling nut so that it does not undergo any deformation, expansion, or contraction, thus increasing the life span of the annular seal. When the coupling nut is threaded over the joint sleeve until the abutment face of the coupling nut abuts against the front face of the joint sleeve, the conical disc spring is compressed between the coupling nut and the central enlarged collar portion, making the colored outside of the conical spring invisible and thus enabling the installer to observe the tightness of the coupling nut. It is preferred that the side walls of the central enlarged collar portion are made upright with respect to the outside surface of the joint sleeve to make the observation easy.

The conical spring may be mounted so that its outside is opposed to either the central enlarged collar portion or the coupling nut front end to produce the same results. When the coupling nut is tightened, the front end of the joint sleeve abuts against the abutment face of the coupling nut thus providing the thread portions with a large tensile force which increases the friction resistance between the male and female threads which in turn provides a large fastening force. In addition, the joint sleeve and coupling nut are tightly pressed against the annular bead so that the resilient strength of the annular bead is added to the resilient strength of the annual seal and conical spring thus preventing the coupling nuts from becoming loose due to the bending or vibration of the pipes.

As has been described above, the joint mechanism according to the invention has the improved pulling resistance and durability, makes it easy to not only connect or disconnect thin-wall stainless steel pipes by merely tightening or loosing the coupling nuts, thus eliminating the need for a skilled worker, and but also find a loose joint by observation.

BRIEF DESCRIPTION OF THE DRAWING

FIG. 1 a longitudinal section of a joint mechanism for connecting a pair of thin-wall stainless steel pipes according to an embodiment of the invention;

FIG. 2 is a cross-sectional view thereof, taken along the line II—II;

FIGS. 3 and 4 are enlarged sectional views thereof, showing the connection operation;

DESCRIPTION OF THE PREFERRED EMBODIMENT

Figure 5:
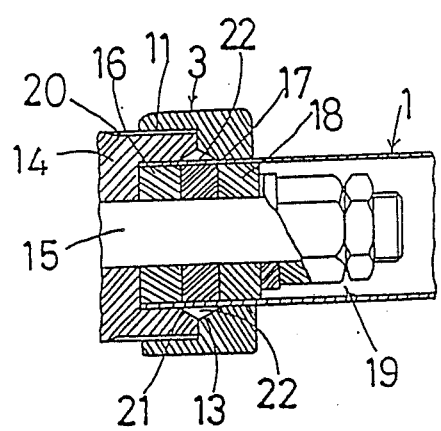
FIG. 5 is a longitudinal section of a annular bead making tool with its pipe expanding rubber under the normal condition.

In FIGS. 1 through 4, a joint mechanism for connecting a pair of thin-wall stainless steel pipes 1 includes a joint sleeve 2, a pair of coupling nuts 3, a pair of annular seals 4, and a pair of conical disc springs 5.

The pipe 1 has at an end a annular bead 6 made by expanding the pipe into the form of a letter V with a pair of inclined faces 6a, 6b. The joint sleeve 2 has on opposite inside edges a pair of annular recesses 7 each having a tapered face 7a and a seal groove 7b. It has a central enlarged collar portion 9 with a pair of side walls 9a against which a front face 3a of the coupling nut 3 abuts via the conical disc spring 5. Also, it has a pair of externally threaded sleeve portions 8 extending laterally from the central enlarge collar portion 9. The coupling nut 3 has a reduced fitting portion 10 which fits over the pipe 1, an internally threaded portion 11 with a diameter greater than that of the fitting portion 10, an abutment face 12 between the fitting portion 10 and the internally threaded portion 11, and an inclined shoulder 13 at the inside edge of the coupling nut 3. The annular seal 4 is made of an elastic material, such as rubber, in the form of a ring with a generally rectangular cross-section, the respective surfaces of which abut against the annular bead 6, the seal groove 7, and the abutment face 12 of the coupling nut 3 when it is set in the seal groove 7b and the pipes 1 are connected via the joint sleeve 2. The conical disc spring 5 is mounted between the front face 3a of the coupling nut 3 and the side wall 9a of the central enlarged collar portion 9, and its outside 5a is provided with a certain color which is distinct from the adjacent members.

To assemble the joint mechanism, one or two coupling nuts 3 are fitted over the pipe 1, and an end or both ends of the pipe 1 are expanded to form a V-shaped annular bead 6 at each end portion. It is preferred to make the angle of the inclined face 6b of the annular bead 6 agree with the angle of the inclined shoulder 13 of the coupling nut 3. To achieve this, it is preferred to use a pipe expanding device such as shown in Japanese Patent Application Kokoku No. 61-13890, which is illustrated in FIGS. 5 and 6.

Figure 6:
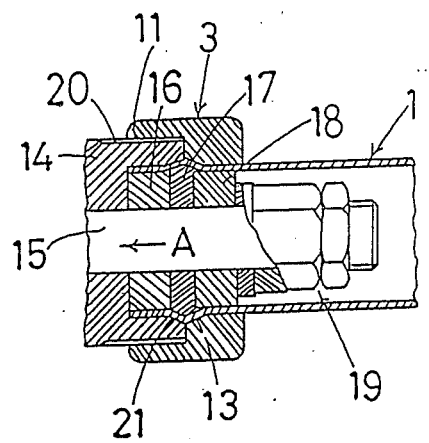
FIG. 6 is a longitudinal section thereof, with the pipe expanding rubber compressed.

In FIGS. 5 and 6, the pipe expanding device includes a pipe expanding head 14 which is secured to a platform (not shown), a shaft 15 which is slidable within the head 14, a rubber support 16 which is fitted over the shaft 15, a pipe expanding rubber 17, a rubber holder 18, and a pusher 19 secured to a free end of the shaft 15.

In operation, as shown in FIG. 5, the coupling nut 3 with female threads 11 is threaded over the head 14 with male threads 20 while the shaft 15, rubber support 16, pipe expanding rubber 17, rubber holder 18, and pusher 19 are inserted into the pipe 1. As shown in FIG. 6, when the shaft 15 is pulled in the direction of an arrow A by a tool (not shown), the rubber support 16 abuts against the head 14. When the shaft 15 is further pulled in the direction A, the pusher 19 pushes the rubber holder 18 in the direction A squeezing the pipe expanding rubber 17 between the rubber support 16 and the rubber holder 18 so that the pipe expanding rubber 17 expands outwardly in the radial direction by a volume equal to the volume reduced by compression between the rubber support 16 and the rubber holder 18. As the pipe expanding rubber 17 expands, the thin-wall stainless steel pipe 1 is expanded into an annular space 20 with a V-shaped cross section defined by the inclined shoulder 13 of the coupling nut 3 and the inclined shoulder 21 of the head 14 to form an annular bead 6. Since the angle of the inclined face 6b agrees with the angle of the inclined shoulder 13, the axes of coupled pipes agree, making a close connection possible. In addition, the coupling nut 3 serves as part of the pipe expanding tool, thus increasing the productivity of forming the annular bead.

Then, the annular seal 4 is fitted in the seal groove 7b of the joint sleeve 2, and the pipe 1 is inserted into the joint sleeve 2 on which the conical disc spring 5 is mounted such that its outside 5a is opposed to the side wall 9a of the central enlarged collar portion 9. When the coupling nut 3 is threaded over the joint sleeve 2 until the abutment face 12 abuts against the front end of the joint sleeve 2, the pipe 1 is fixedly held at the annular bead 6 by the tapered portion 7a of the joint sleeve 2, the inclined shoulder 13 of the coupling nut 3, and the annular seal 4. The annular seal 4 abuts against the inclined face 6a, the seal groove 7b, and the abutment face 12 to prevent the fluid from leaking from the pipe. When the coupling nut 3 is threaded over the joint sleeve 2 until the abutment face 12 abuts against the front end of the joint sleeve 2, the conical disc spring 5 is completely compressed between the coupling nut face 3a and the side wall 9a so that the outside colored surface 5a is no longer visible, thus indicating that the coupling nut 3 is fully tightened to the joint sleeve 2.

INDUSTRIAL APPLICABILITY

The joint mechanism according to the invention is useful for connecting thin-wall stainless steel pipes for conducting city water, hot water, steam, pressurized steam, powder, or granules, and especially useful as a removable joint sleeve for connecting pipes which allows no leakage and requires a long service.

What is claimed is:

1. A joint mechanism for connecting a pair of thin-wall stainless steel pipes each having at an end portion V-shaped annular bead with first and second inclined faces, which comprises:

a joint sleeve having a diameter sufficiently large to receive said pipe, said joint sleeve consisting of a central enlarged collar portion with a pair of opposite abutment surfaces and a pair of externally threaded sleeve portions extending laterally from said central collar portion and each provided with a terminal abutment surface;

a pair of conical springs each fitted on said externally threaded sleeve portion of said joint sleeve and having a distinctive color on its outside except for its peripheral edge; and a pair of coupling nuts each having a terminal end portion which defines an end face and an internally threaded portion for engagement with said externally threaded sleeve portion and a reduced fitting portion having a diameter to fit over said pipe, so that when said coupling nut is threaded on said joint sleeve completely, each said bead is engaged by said terminal abutment surface and reduced fitting portion and said end face and said abutment surface engage said conical spring and deform said conical spring into such a configuration that said distinct color is completely covered by said end face and abutment surface and disappears from view, with only said peripheral edge exposed, thus providing a visual signal which indicates that said coupling nut is fully tightened.

2. The coupling mechanism of claim 1, wherein said conical spring has an inside diameter such that said conical spring closely fits on said externally threaded sleeve portion, whereby said conical spring is prevented from easily falling off from said joint sleeve during installation.

* * * * *